United States Patent [19]

Neefe

[11] Patent Number: 4,639,105
[45] Date of Patent: Jan. 27, 1987

[54] SPIN CAST OCULAR COSMETIC DEVICE WITH COLOR SEPARATION

[76] Inventor: Charles W. Neefe, 811 Scurry St., Box 429, Big Spring, Tex. 79720

[21] Appl. No.: 771,236

[22] Filed: Aug. 30, 1985

Related U.S. Application Data

[63] Continuation-in-part of Ser. No. 751,484, Jul. 3, 1985, which is a continuation-in-part of Ser. No. 740,569, Jun. 3, 1985, which is a continuation-in-part of Ser. No. 642,114, Jul. 17, 1984, Pat. No. 4,534,915, which is a continuation-in-part of Ser. No. 506,873, Jul. 5, 1983, abandoned, which is a continuation-in-part of Ser. No. 417,641, Sep. 9, 1982, Pat. No. 4,416,837.

[51] Int. Cl.$^4$ ............................................. B29D 11/00
[52] U.S. Cl. .................................... 351/162; 264/1.1; 264/1.7; 264/2.1; 264/311; 425/808
[58] Field of Search ................... 264/1.1, 2.1, 1.7, 1.9, 264/311; 425/808; 351/162

[56] References Cited

U.S. PATENT DOCUMENTS

| | | | |
|---|---|---|---|
| D. 211,757 | 7/1968 | Urbach | 351/162 |
| 2,241,415 | 5/1941 | Moulton | 425/808 |
| 3,536,386 | 10/1970 | Spivack | 351/162 |
| 4,121,885 | 10/1978 | Erickson et al. | 351/160 H |

FOREIGN PATENT DOCUMENTS

| | | | |
|---|---|---|---|
| 1629343 | 9/1972 | Fed. Rep. of Germany | 264/2.1 |
| WO83/00481 | 4/1982 | PCT Int'l Appl. | 351/162 |

Primary Examiner—James Lowe

[57] ABSTRACT

A spin cast cosmetic device to be worn on the cornea that changes the apparent color of the eye. The device has color bands of pigments and dyes which are separated by the spin casting operation. Pigment particles migrate and are separated, the dyes do not migrate. Unexpectedly the pigments separate into two concentric bands, one at the center and one at the periphery. The area between the pigment bands is colored by the soluble dye.

14 Claims, 3 Drawing Figures

SPIN CAST OCULAR COSMETIC DEVICE WITH COLOR SEPARATION

This is a continuation in part of patent application Ser. No. 751,484, filed 07/03/85 entitled; "A SPIN CAST LENS WITH CENTRAL APERTURE" which is a continuation in part of patent application Ser. No. 740,569, filed 06/03/85 entitled; "A GYROSCOPICALLY STABILIZED SPIN CAST MACHINE" which is a continuation in part of patent application Ser. No. 642,114, filed 07/17/84 entitled; "METHOD OF CONTROLLING THE ULTRAVIOLET POLYMERIZATION OF SPIN CAST LENSES" now U.S. Pat. No. 4,534,915 which is a continuation in part of Ser. No. 506,873 filed 07/05/83 entitled "IMPROVEMENTS IN SPIN CASTING HYDROGEL LENSES" now abandoned, which is a continuation in part of Ser. No. 417,641 entitled; "SIMPLIFIED IMPROVEMENTS IN SPIN CASTING" filed 09/09/82, now U.S. Pat. No. 4,416,837.

PRIOR ART

Spin casting consists of polymerizing a suitable monomer composition in an open mold cavity having a concavely curved bottom surface and rotating about an upright axis transverse of that surface. There is obtained a shape-retaining polymer body having a convex bottom surface conforming to the mold surface, and a concave top surface which has the shape of a paraboloid formed by the rotation of the mold. By centrifugal force a change of curvature in the monomer is caused. The parabolic shape is distorted by the effect of the centrifugal forces on the lens shape. The surface tension of a known polymerization mixture is constant and predictable at a fixed temperature, and the power of a lens is therefore predictable and reproducible.

The art of spin casting contact lenses has been in use for nineteen years. The principal value of spin casting is its low labor cost and high production. The disadvantages are the lenses are not spherical and the aspheric surface is of a shape that increases spherical aberration when in place on the eye. The exact shape of a spin cast surface is most difficult to describe due to its being formed by several forces including centrifugal force, surface tension, gravity and radius of the concave mold. Also the lens monomer undergoes changes during polymerization. These changes include shrinkage, increase in viscosity, gelation, exotherm and solidification. It is desirable to start polymerization at the center and proceed toward the edge. In spin casting the reverse has been true. The edge of the concave lens surface being slightly nearer the ultraviolet light source polymerizes before the central area.

STATE OF THE ART

The most simple case of the spinning surface occurs when the surface tension can be neglected. In this case the spinning surface is a paraboloid which in cylindrical coordinates (z,r) is described by the equation:

$$z = \frac{w^2 r^2}{2g}$$

w=2πn, n=spin speed, and g=gravitational constant

Actual spin casting involves a combination of the static and spinning cases. The equation describing the spinning fluid surface contains separate terms relating to the stationary and spinning states:

$$z = \frac{w^2 r^2}{2g} + \frac{a}{pg}\left(\frac{1}{R_1} + \frac{1}{R_1}\right)$$

a=surface tension
p=density
$R_1$=radius of osculatory sphere at (r,z)
$R_2$=radius of meriodional sphere at (r,z)

With the monomer formulation in the casting mold and the cover sealed, the motor is started and brought to the speed selected. The speed to be used is dependent upon the focal length of the paraboloid surface desired according to the formula:

$$f = \frac{g}{2w^2}$$

where the focal length is in m/m, the gravitational acceleration constant is in m/m/sec², and the rotational velocity is in radians/sec.

This formula may be developed by considering the forces acting on the liquid. A body of liquid lying at rest will form a surface normal to the force of gravity acting upon it. In the same manner, if a liquid is held in a container which is rotated about a vertical axis, a surface will be formed which is everywhere normal to the resultant force acting on each surface element.

It can be shown mathematically that when a liquid is revolved in a horizontal plane, the free surface takes the form of a paraboloid, a parabola of revolution. ("Fluid Mechanics," R. C. Binder, 3rd Edition, 1955, Prentice-Hall, New York). Moreover, it can further be shown that, since the equation of the parabola is:

$$y^2 = 4fx$$

the focal length f of the paraboloid so formed is a function of the speed of rotation. This can be expressed more simply by the following formula:

$$F \text{ in meters} = \frac{4,447}{(RPM)^2}$$

The density and viscosity of the liquid rotated does not affect the focal length of the paraboloid.

Vibrations produce standing waves on the surface of the liquid lens monomer. This must not be allowed if optical surfaces are to be obtained. Large heavy machines anchored to concrete pillars have been used to reduce vibration.

Precise repeatable control of the rotational speed is required to control the lens refractive power.

The concave mold must also rotate about a stable center of rotation if true surfaces are to be obtained.

IN THE DRAWINGS

SUBJECT OF THE INVENTION

Figure 1:
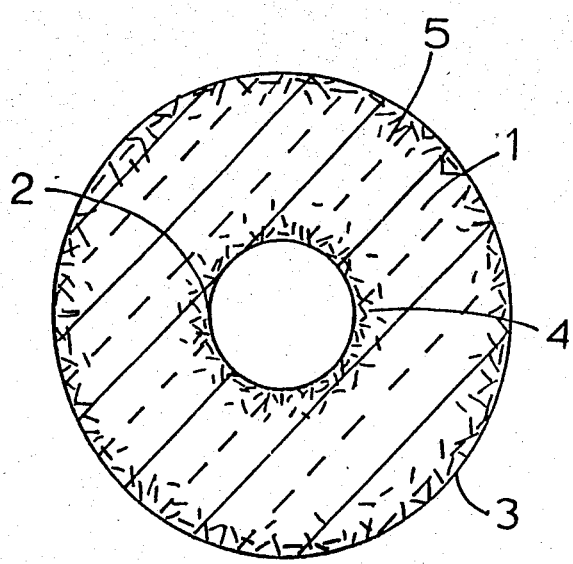
FIG. 1 shows the cosmetic aperture device from the front.

The manufacture of plano or zero power contact lenses is most difficult and expensive. A solution has been found by making the lens with central aperture. The aperture being from 2.0 milimeters to 6.0 milimeters in diameter. The edges of the central aperture are tapered thereby thinning the lens around the aperture. This thinning of the aperture edge is necessary to reduce the tear miniscus formed by surface tension at the aperture edge. The edge thinning also provides a comfortable lens and minimum of foreign body sensation as the eyelid travels over the aperture during the blink.

The opening at the lens center prevents hypoxia and the formation of edema. The non-refraction aperture lens can be tolerated for extended periods of time without the problems encountered with refractive lenses. The materials used may be stronger and more durable since no consideration of oxygen permeability is required. The aperture lens may be tinted by dying or by adding the colorant to the liquid monomer before polymerization. The aperture non-refractive lens is made from any of the available soft lens materials. Materials which are translucent and cannot be used for refractive lenses may also be used since the central visual area is an open aperture. The material surrounding the central hole must provide comfort and the desired color for cosmetic enhancement.

Particulate coloring matter may be added to achieve an unexpected color opportunity. Particulate coloring such as titanium dioxide as used in white paint or Afflair pearl luster pigments made by E & M industries of Hawthorne, N.Y. provide the unexpected coloring. Afflair pigments have a particle size of from 1 micron to 110 microns. The specific gravity of Afflair is from 2.8 to 3.2.

Pearl Lustre Pigments consist of platelets of titanium dioxide-coated mica. They are physiologically safe, and are supplied as an unextended dry powder.

The grade of Pearl Lustre Pigments are differentiated by color, color effect and particle size. Particle size influences the perceived texture of the pearl lustre effect.

The carrier incorporated with Pearl Lustre Pigments can be colored with other transparent pigments and dyestuffs to tailor effects as desired.

Unlike conventional color pigments and dyes, whose color derives from selective absorption of certain wavelengths of visible light, the color and iridescence obtained with Pearl Lustre Pigments are produced by light interference. A well-known example of color by light interference is the iridescent play reflecting from a thin film of oil on water: the rainbow-like hues result from interference and reinforcement of selected wavelengths of visible light reflecting simultaneously from the air-oil interface and the oil-water interface of the film.

When the hydrogel monomer containing the particulate matter is spun cast, an unexpected result is observed. The heavier pigment particles do not migrate to the outer edge as would be expected. A separation occurs, the particles near the center of the concave mold remain near the center adjacent to the central protrusion 4 FIG. 1. The other particles migrate toward the edge 5 FIG. 1. This may be due in part to the small miniscus formed at the liquid junction 2 FIG. 2. Dyes which are dissolved in the monomer do not migrate only the particles suspended in the monomer are separated by the centrifugal force. The shape of the concave mold having a central protrusion results in the color separation. If the central protrusion is removed from the concave mold, no separation occurs. It is now possible to spin cast cosmetic devices having a different color around the pupil or a different shade of the same color. This is made possible by using a soluble dye which does not migrate and a particulate pigment of a different color which will migrate when subjected to centrifugal force.

Figure 2:
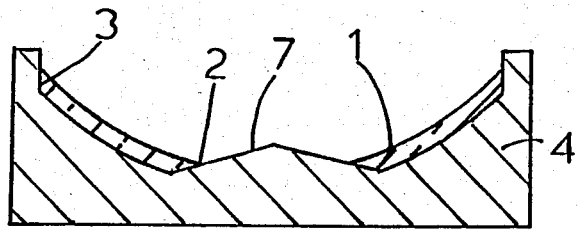
FIG. 2 shows the cosmetic aperture device in the spin cast mold in section.
Figure 3:
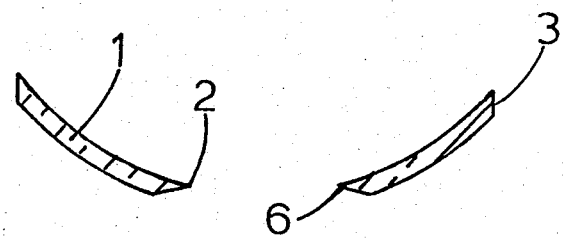
FIG. 3 shows the cosmetic aperture device in section.

The aperture non-refractive device is spin cast as follows:

A concave spin casting mold, 4 FIG. 2 shown in section is provided. The mold has a conical protrusion, 7 FIG. 2, in the center. A colored liquid monomer 1 FIG. 2 is spin cast around the conical protrusion 7 FIG. 2. A combination of a soluble dye and a pigment such as titanium dioxide or mica particles 4 and 5 FIG. 1 are added to the liquid monomer 1 FIG. 2. The mold 4 FIG. 2 is rotated about its axis and the monomer 1 FIG. 2 forms the concave device. Due to the shape of the concave mold having a central protrusion 7 FIG. 2 the pigment particles are separated by centrifugal force. Unexpectedly some pigment remains near the center 4 FIG. 1 and the remainder are separated and moved to the periphery 4 FIG. 1 of the rotating mold. The monomer 1 FIG. 2 is allowed to polymerize to form a solid device having a circular hole in the center. The edge of the circular central aperture 6 FIG. 3 is tapered forming a thin inner edge 2 FIGS. 1, 2 and 3 around the central aperture. The device 1 FIG. 2 is removed from the spin cast mold 4 FIG. 2. FIG. 1 shows the device from the front 1 FIG. 1, the device body 2 FIG. 1, the edge of the central aperture. 3 FIG. 1 being the outer edge of the device. The pigment near the center is shown by 4 FIG. 1 and the pigment near the edge 5 FIG. 1. The outer edge 3 FIG. 1 and 3 may be shaped as desired for comfort. FIG. 3 shows the device in section 1 FIG. 3 the device body 2 FIG. 3 the edge of the central circular aperture, 6 FIG. 3 being the sloping edge of the central aperture. The surface 6 FIG. 3 may also be a curve which eliminates the junction with the convex surface. 3 FIG. 3 the edge of the device as removed from the spin cast mold. The cosmetic device is removed from the mold 4 FIG. 2 by wetting and partially hydrating the device 1 FIG. 2 and allowing the device to slowly air dry. The concave surface exposed to the air will dry before the convex surface against the mold. The dry concave surface being shorter will pull the convex surface free from the mold. The edge is accessible in the xerogel hard state and may be shaped and polished.

Examples of the Monomer Mixture Are:

| | | |
|---|---|---|
| (1) | Ethylene glycol monomethacrylate | 64.8% |
| | Diethylene glycol monomethacrylate | 7.056% |
| | Ethylene glycol dimethacrylate | 0.144% |
| | Water | 20.9% |
| | Ammonium persulfate | 1.1% |
| | 2-dimethylaminoethyl acetate | 6.0% |
| (2) | Ethylene glycol monomethacrylate | 54.7% |
| | Diethylene glycol monomethacrylate | 17.2% |
| | Diethylene glycol dimethacrylate | 0.6% |
| | Ammonium persulfate | 1.1% |
| | Dimethylaminoethyl acetate | 5.8% |

Antimicrobial agents may be added to the monomer before polymerization and locked into the polymeric structure of the device. These agents prevent the growth of micro organisms on the device surface and eliminate the need for disinfecting. Examples of useful antimicrobial agents are: 3-(trimethoxysilyl) propylocta decyldimethyl ammonium chloride, known as Dow Corning 5700 and hexachlorophene.

It should be understood that the invention is not limited to the exact details of construction shown and described herein for obvious modifications will occur to persons skilled in the art.

I claim:

1. A rotationally cast ocular cosmetic device that alters the apparent color of the eye and is substantially the size and curvature of the cornea upon which it is placed and has a central visual aperture substantially the size of the pupil and positioned on the cornea around the pupil of the eye having a plurality of concentric color components made from a composition comprising a liquid monomer, a soluble dye and suspended pigment particles, the composition is placed in a concave mold, having a central conical protrusion around which the central open visual aperture is formed, and rotated around the central mold axis allowing the suspended pigment particles to migrate toward the device periphery, the soluble dye does not migrate, the rotating liquid monomer is allowed to polymerize forming a solid cosmetic device having a plurality of concentric color components.

2. The subject matter set forth in claim 1 wherein the cosmetic device is removed from the spin cast mold by first wetting the device and drying the device, the concave air exposed device surface drys before the convex surface adjacent to the spin cast mold, the change in curvature produced by the wet and dry surfaces frees the device from the mold.

3. The subject matter set forth in claim 1 wherein antimicrobial agents are added to the liquid monomer before polymerization.

4. The subject matter set forth in claim 1 wherein the device is a hydrogel.

5. The subject matter set forth in claim 1 wherein the device is made from a translucent material.

6. The subject matter set forth in claim 1 wherein the pigments and dye are of different colors.

7. The subject matter set forth in claim 1 wherein the opening at the device center prevents hypoxia and the formation of edema.

8. A rotationally cast ocular cosmetic device that alters the apparent color of the eye having a plurality of concentric color components and is substantially the size and curvature of the cornea upon which it is placed and has an open central visual aperture substantially the size of the pupil and positioned on the cornea around the pupil of the eye, made from a composition comprising a liquid monomer, a soluble dye and suspended pigment particles, the composition is placed in a concave mold having a central conical protrusion which forms the central visual aperture and the concave mold is rotated around its central axis, some of the suspended pigment particles migrate to the device periphery, other suspended pigment particles remain adjacent to the open central visual aperture, the soluble dye does not migrate, the rotating liquid monomer is allowed to polymerize forming a solid cosmetic device having a plurality of concentric color components surrounding the central open visual aperture.

9. The subject matter set forth in claim 8 wherein the cosmetic device is removed from the spin cast mold by first wetting the device and drying the device, the concave air exposed device surface drys before the convex surface adjacent to the spin cast mold, the change in curvature produced by the wet and dry surfaces frees the device from the mold.

10. The subject matter set forth in claim 8 wherein antimicrobial agents are added to the liquid monomer before polymerization.

11. The subject matter set forth in claim 8 wherein the device is a hydrogel.

12. The subject matter set forth in claim 8 wherein the device is made from a translucent material.

13. The subject matter set forth in claim 8 wherein the pigments and dye are of different colors.

14. The subject matter set forth in claim 8 wherein the opening at the device center prevents hypoxia and the formation of edema.

* * * * *